United States Patent Office 2,847,763
Patented Aug. 19, 1958

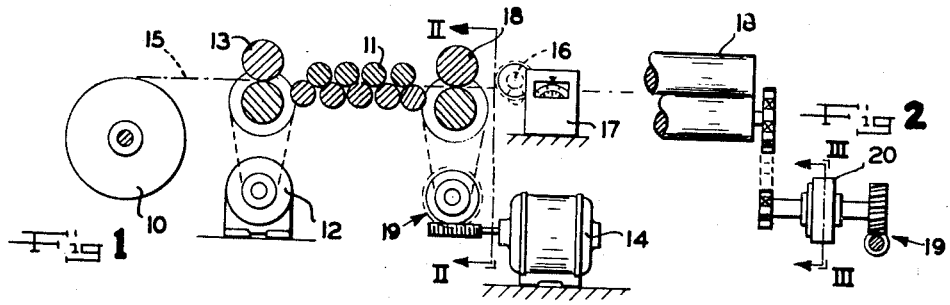
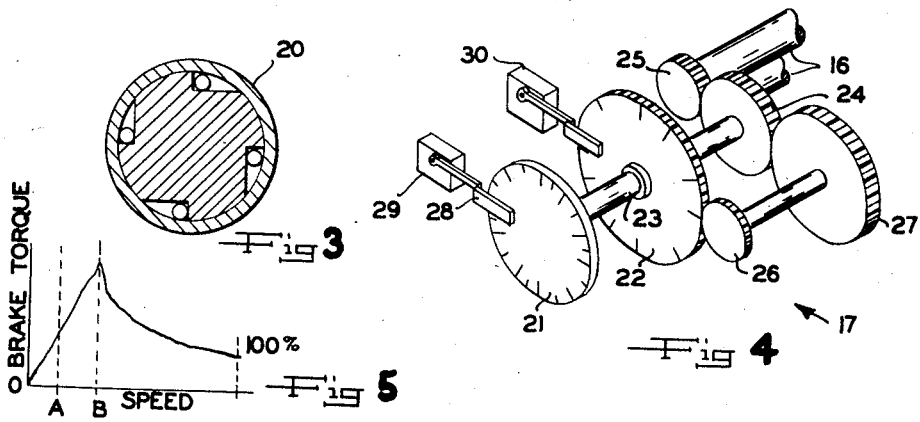
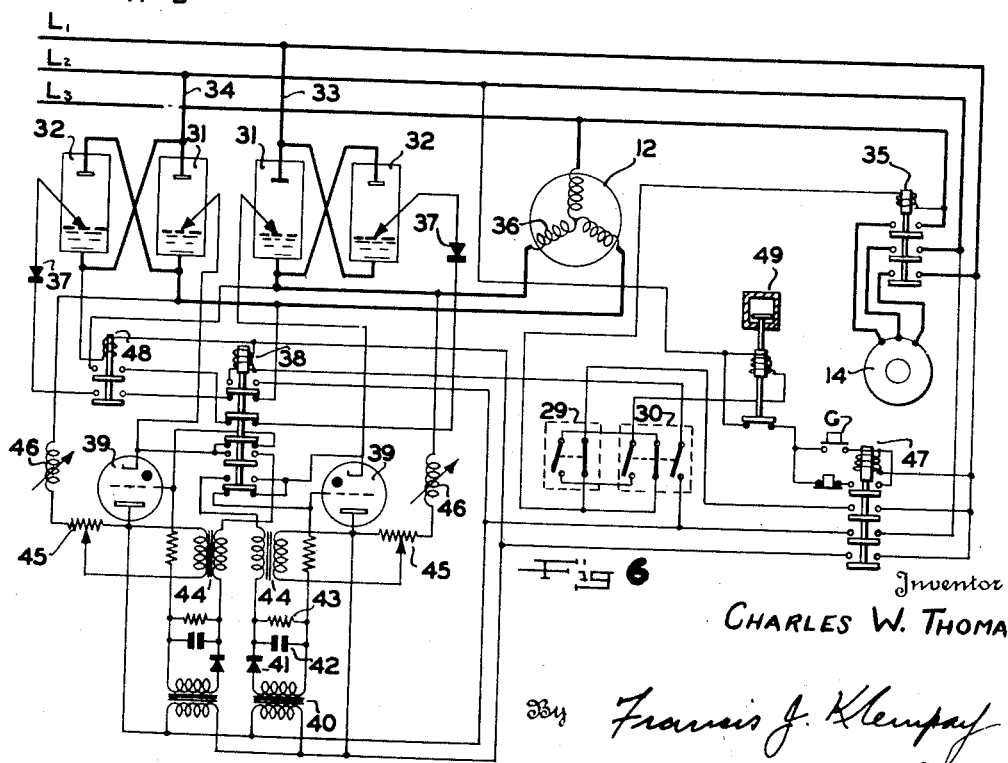
Inventor
CHARLES W. THOMAS
By Francis J. Klempay
Attorney

2,847,763

PLURAL MOTOR DRIVE SYSTEM CONTROLLED BY MEASURING ROLLS

Charles W. Thomas, Warren, Ohio, assignor to The McKay Machine Company, Youngstown, Ohio, a corporation of Ohio Original application January 12, 1952, Serial No. 266,211, now Patent No. 2,735,055, dated February 14, 1956. Divided and this application January 6, 1956, Serial No. 557,729

14 Claims. (Cl. 33—132)

The present application is a divisional case of my co-pending patent application, Serial No. 266,211, filed January 12, 1952, which has matured into U. S. Patent No. 2,735,055, wherein is disclosed a control circuit for dynamic braking of motors.

The invention, in general, relates to a plural motor drive system and in particular to that type of plural drive system having diverse operating characteristics. As an example, such a motor drive system may be utilized in driving sheet material process lines wherein the sheet material must be fed in predetermined lengths with extreme accuracy. In installations of this type, it has been usual practice to employ an induction motor whose stator coils may be selectively connected to an A. C. or D. C. source of power. A strong braking torque may be obtained by substituting D. C. voltage for normal A. C. operating voltage as the magnetic field produced thereby is stationary in nature. As the rotor continues to revolve in the stationary field a high current is generated within the bars or the coils of the stator to produce a torque which acts in opposition to the rotation of the motor and this brings it to a quick stop. At the outset it should be noted that the motors required are of considerable size and electrical motors of the type employed have a braking torque which is highly irregular over its entire speed range. In addition the sheet material, especially in the case of metal strip, has high inertia when traveling at relatively high velocities and these features make it very difficult, if not impossible, to predict the distance in which the apparatus may be stopped from full speed. Further, various irregularities are likely to appear in successive cycles even after the stopping distance has been determined by trial and error.

It is therefore the primary object of the invention to provide a new and novel plural motor driving system having diverse operating characteristics for controlling process lines, for example, whereby the same will be operative to feed strip in predetermined lengths with extreme accuracy and with a minimum loss of time during the slow down and stopping periods.

Yet another object of the invention is the provision of a motor drive system having the characteristics outlined above which is able to withstand the demands of continuous operation.

A further object of the invention is the incorporation of the control circuits described in my co-pending patent application, above identified, to control a plural motor drive system wherein the various problems heretofore encountered will be substantially mitigated.

These as well as other objects and advantages of the invention, will become apparent, upon full consideration of the following detailed specification and accompanying drawing wherein is disclosed a certain preferred embodiment of the invention.

In the drawing:

Figure 1 is a schematic view of a metal processing line utilizing the plural drive control of my invention to accurately regulate the movement of the stock;

Figure 2 is a fragmentary sectional view taken along line II—II of Figure 1 showing a slow feeding stock feeding means;

Figure 3 is a fragmentary sectional view taken along line III—III of Figure 2 showing an overrunning type clutch as incorporated in the feeding means of Figure 2;

Figure 4 is a schematic view of a stock feed measuring device utilized in the apparatus of Figure 1;

Figure 5 is a graphic representation of torque versus percent of slip in the dynamic braking of a typical induction motor; and Figure 6 is a schematic wiring diagram of an illustrative control embodying the teachings of my invention as used in controlling the process line of Figure 1.

Referring now to the drawing and initially to Figure 1 thereof, the numeral 10 represents a strip uncoiler from which stock 15 may be fed into a leveler compriser of the rolls 11, 13 and 18 and thence into a shear or other metal working device, not shown. The feeding is accomplished primarily by the motor 12 which is operatively connected to the leveler, but as will be understood more fully upon complete consideration of the specification, a second motor 14 is utilized to accurately feed the stock into its final position.

In highly repetitive operations, wherein the control of my invention may be most usefully employed, accuracy in feeding is of paramount importance to the economic success of the job. In an attempt to maintain a reasonable degree of accuracy, it is presently common practice to utilize an accurate measuring device, for example, the one shown at 17, which is operative to control the main drive motor 12 in response to a predetermined angular movement of measuring rolls 16 through which the stock 15 is caused to pass. In order to avoid overtravel of the stock 15 due to the high inertia of the feeding and leveling equipment, it has been proposed to provide a slow-down switch which is actuated by the measuring device 17, and which is operative at a predetermined point in the feeding cycle to cause the motor 12 to operate at a very slow speed. Thus, when the stopping point is reached, a stop switch is actuated by the measuring device 17 to stop the motor 12 with relatively little coasting.

This method is nevertheless subject to many variable factors, such as bearing friction and fluctuations in feed velocity, for example, which cause inherent inaccuracies in feeding. Thus, it is necessary to provide substantial tolerance in the increment stock to be fed in order to insure against occasional underfeeding, which generally renders that portion of the stock totally worthless. The tolerance required represents a considerable waste of valuable material which may be greatly minimized by the plural drive system of my invention as will become readily apparent.

In the present invention, I use an auxiliary motor 14 which drives the leveler rolls through a suitable speed reducing mechanism 19. The levelers are adapted to be driven at a much lower speed by the motor 14 than during normal uncoiling operations and, therefore, I provide the overrunning clutch 20 which connects the speed reducing means 19 to the leveler and thus permits the rolls thereof to overrun the slow speed moving means while the stock is being fed at high speed by the motor 12.

In the proposed drive system, a cycle is started by energizing the motors 12 and 14, with the motor 12 feeding the stock at high speed while the motor 14 merely idles until the measuring device 17, which comprises the slow-down and stop switches 30 and 29, respectively, operates at a predetermined point in the feeding cycle to dynamically brake the motor 12 and thereby cause the same to rapidly slow down. After a sufficient reduction of speed, the auxiliary motor 14 begins to feed the stock against the restraining action of the dynamically braked motor 12, until the stop switch of the measuring device 17 is actuated to open the circuit of the auxiliary motor 14 and the entire apparatus is brought to a complete stop by the retarded motor 12.

In Figure 5, wherein is shown a typical torque-speed or slip curve for a dynamically braked squirrel cage induction motor, it may be observed that maximum braking occurs at point B or approximately ten percent of the operating speed. Further, it will be observed that the curve very closely approximates a straight line from zero torque to maximum torque for speed less than that indicated by point B. For this reason, it is desirable, although not necessary, to operate the auxiliary motor within this range as, for example, five percent of the maximum operating speed of the motor which is shown on the graph as point A.

In Figure 4 of the drawing there is schematically shown the construction of the measuring device 17 which is of preferred construction for incorporation in the illustrated feeding line. This device comprises a pair of indicating discs 21 and 22, the outer disc of which is mounted on the shaft 23 while the disc 22 is journaled thereon. Upon rotation of the measuring rolls 16, the disc 21 is caused to rotate at a high speed through spur gears 24 and 25, while the disc 22 rotates at a much lower speed by virtue of the gearing of the gears 27 and 26. The discs 21 and 22 carry the arms 28 which operate the limit switches 29 and 30 with the switch 29 acting as the stop switch and the switch 30 operative as the slow-down switch. Because the disc 21 rotates several times during each revolution of the disc 22, the limit switch 29 will have to be circuited to remain ineffective until the slow-down switch 30 is actuated. Generally, there is incorporated in apparatus of this nature means, not shown, which is operative in angularly displaced relation to the switches 29 and 30. Thus, a predetermined increment of stock is measured and fed by the arms 28 rotate into position to trip both limit switches 29 and 30, and the arrangement shown provides a high degree of accuracy since the position of the final stop is governed in a sensitive manner by the rapidly rotating disc 21.

In the control circuit of the apparatus as shown in Figure 6, conductors L1, L2 and L3 provide a source of three phase power for operating the motors 12 and 14. As may be observed, the motor 12 is directly connected to the conductor L3, but is connected to the conductors L1 and L2 by means of the conductors 33 and 34 into each of which is interposed a pair of inversely connected electronic discharge type contactors 31 and 32 by means of which the current flow to the motor 12 may be controlled and regulated as will be apparent. The auxiliary motor 14 is connected to the power source through a relay switch 35.

For controlling the firing of the electronic discharge devices 32, I provide ignitor circuits, including the rectifiers 37 and the normally closed contacts of relay 38, the arrangement being such that the devices 32 will fire on alternate half cycles until such a time as the slow-down limit switch 30 is tripped to energize the relay 38 and open the ignitor circuits.

The electronic discharge devices 31 are controlled by the ignitor circuits comprising the anode-cathode circuits of the conventional gaseous discharge devices 39. I may control the amount of current passing through the devices 31 by the expedient of applying grid control to the devices 39 in such a manner to delay firing for a predetermined interval of each half cycle. It is desirable, as will be hereinafter more fully explained that during normal operation (i. e. when sheet strip is being fed at high speed by the motor 12) that the devices 31 will be rendered conductive over the full half cycle and this is accomplished in the present instance by connecting the grids of the tubes 39 to the cathodes thereof through the normally closed contacts of the relay 38.

Delayed firing of the gaseous discharge devices 39 is desirable during braking of the motor 12 and this may be accomplished by providing each device with a second grid control circuit in parallel with the first including normally open contacts of the relay 38. In each of these circuits I conventionally provide the transformer 40, the rectifier 41, the capacitor 42, and the resistor 43, which elements operate cooperatively to supply a control potential sufficient to render the devices 39 non-conductive. In accordance with usual practice, I provide the transformer 44 whose secondary is connected in said parallel grid circuit and whose primary is connected to a reference voltage with respect to the plate voltage of the device 39. The control for the grid voltage of the devices 39 comprises the potentiometer 45 and the variable inductor 46 interposed in the primary of the transformer 44 so that it is possible to obtain infinite variation over the full half cycle and the electronic valves 31 are fired to get the best braking results as will be later explained.

Since each device is controlled by a separate control circuit, the potentiometers 45 and the variable inductors 46 may be mechanically interconnected, so that both of the devices 39 are regulated equally by setting one inductor or potentiometer.

Other elements of the electrical control circuit are best illustrated when considering the operation thereof which is as follows: Start button G is pushed to energize relay 47, simultaneously energizing relays 35 and 48 and devices 39 to start the auxiliary motor 14, and the main drive motor 12 by the firing of the firing devices 31 and 32. Thus, both motors 12 and 14 operate at full speed; the drive motor 12 rapidly feeding the stock while the auxiliary motor idles under no load. Responsive to feeding a predetermined fraction of the desired strip length, the slow-down switch 30 trips energizing relay 38, which opens the firing circuits of the devices 32 and renders the same non-conductive and also connects the firing delay controls into the grid circuits of the devices 39 for controlling the firing of the valves 31. The delay controls are preset at the desired position to obtain the most effective braking as will be now explained.

With only the devices 31 operative to fire on alternate half-cycles of the input potential, it will be understood that the resulting current to the motor 12 will be a pulsating direct current which, when partially smoothed by the inherent inductance of the stator coils 36, acts to impress on these coils a stationary magnetic field of relatively constant proportions. This direct current field causes a dynamic braking of the motor 12 which rapidly retards the same and the feeding apparatus to a point at which the auxiliary motor 14 takes control and begins to feed stock.

As the motor 12 is braked sufficiently to a speed corresponding to that indicated at A of Figure 5, the auxiliary motor 14 begins to feed the stock at that speed. Feeding is continued at this speed until the remaining fraction of the desired stock length is registered and the limit switch 29 is tripped to cause deenergization of the relay 35, stopping the motor 14, and causes energization of the time delay relay 49. After a predetermined time interval, during which the braking action of the motor 12 brings the apparatus to a complete stop, the relay 49 opens thereby deenergizing the relay 47 to end the cycle. If desired, additional circuiting, not shown, may be utilized to reenergize relay 47 and cause automatic recycling of the apparatus.

In some applications of the present plural motor drive, it may be desirable to regulate the control apparatus to prevent overheating of the motors, and it is contemplated that when this is desired, a circuit, as utilized in my copending application, above identified, will be incorporated. This circuit provides automatic means for adjusting and limiting the current flow to the main drive motor during braking.

It should thus be apparent that I have accomplished the objects initially set forth by providing a new and novel plural motor drive system having diverse operating characteristics for applications where frequent starting and stopping are required such as in a strip feeding device. The use of a comparatively simple electronic control circuit eliminates the need of a separate source of direct current and the need of large mechanical contactors which are susceptible to wear and pitting from severe use.

Another aspect of the present invention relates to a strip feeding system adapted for stopping and starting stock with a high degree of accuracy in a minimum of time. It should be understood that the relative time for stopping the strip by the method disclosed herein is not much longer than braking the main drive motor from full speed to a complete stop as the auxiliary motor 14 need but operate momentarily to establish the reference speed A.

It should be understood, however, that the use of the plural motor drive of my invention is not limited to the apparatus illustrated, but may be effectively employed whenever drive means of this nature is desired. Reference should therefore be had to the following appended claims in determining the full scope of the invention.

I claim:

1. In apparatus for feeding continuous stock in predetermined increments the combination of a first electric induction motor for operating said apparatus at relatively high speed, a second electric motor for operating said apparatus at relatively low speed, an overrunning clutch connecting said second mentioned motor with said apparatus operative to disengage said apparatus from said second mentioned motor while said first mentioned motor is driving said apparatus forwardly, an A. C. power source connectable to said motors for operating the same in a forward direction to cause feeding of said stock, inversely connected uni-directional current valves interposed between said first mentioned motor and said source, a first measuring means responsive to the feeding of a predetermined fraction of said predetermined increment operable to render one of said valves nonconducting to cause passage of unidirectional half cycles of said A. C. power to said first mentioned motor whereby said motor and said apparatus are dynamically braked, said second mentioned motor being adapted to thereafter cause feeding movement of said apparatus at slow speed against the restraining action of said first mentioned motor, a second measuring means operative in response to the feeding of the remaining fraction of said predetermined increment to remove the power from said second mentioned motor, and time delay means operative after a predetermined time wherein the restraining action of said first mentioned motor causes the said apparatus to come to rest to disconnect said first mentioned motor from said power source.

2. Apparatus according to claim 1 further characterized by said current valves comprising electronic discharge devices, firing means for said electronic discharge devices operable to normally render the same fully conductive during feeding of said stock, said first mentioned measuring means being operative to cause one of said electronic discharge devices to be rendered nonconductive, and said time delay means being operative to render the other of said discharge devices nonconductive.

3. Apparatus according to claim 2 further characterized by said first mentioned measuring means being operative when rendering said one of said electronic discharge devices nonconductive to cause the other of said electronic discharge devices to be nonconductive during a predetermined portion of a half cycle.

4. In apparatus for feeding continuous stock in predetermined increments the combination of a first electric induction motor for operating said apparatus at relatively high speed, a second motor for operating said apparatus at relatively slow speed, said second mentioned motor being releasably connected to said apparatus whereby said second mentioned motor may be operated at normal speed while said apparatus is operated at high speed by said first mentioned motor, a source of electrical energy for operating said second mentioned motor, a source of A. C. electrical energy for operating said first mentioned motor, inversely connected unidirectional current valves interposed between said first mentioned motor and said source of A. C. electrical energy, a first measuring means operative in response to the feeding of a predetermined fraction of said predetermined increment to interrupt the flow of current through one of said current valves to cause unidirectional half cycles of current to flow from said A. C. source to said first mentioned motor whereby said first motor and said apparatus are dynamically braked, said second mentioned motor being operative to thereafter continue feeding movement of said apparatus at slow speed, second measuring means operative in response to the feeding of the remaining fraction of the said predetermined increment to disconnect said first mentioned source from said second motor, and time delay means operative after a predetermined interval of time after the disconnecting of said second mentioned motor to disconnect said first mentioned motor from said A. C. source.

5. In apparatus for feeding continuous stock in predetermined increments the combination of a first electric induction motor for operating said apparatus at relatively high speed, a second motor for operating said apparatus at relatively slow speed, said second mentioned motor being releasably connected to said apparatus whereby said second mentioned motor may be operated at normal speed while said apparatus is operated at high speed by said first mentioned motor, a source of electrical energy for operating said second mentioned motor, a source of A. C. electrical energy for operating said first mentioned motor, a first measuring means operative in response to the feeding of a predetermined fraction of said predetermined increment to cause unidirectional current to flow to said first motor whereby said first mentioned motor and said apparatus are dynamically braked, said second mentioned motor being operative to thereafter continue feeding movement of said apparatus at slow speed, second measuring means operative in response to the feeding of the remaining fraction of said predetermined increment to disconnect said first mentioned source from said second mentioned motor, and time delay means operative after a predetermined interval of time after the disconnecting of said second mentioned motor to discontinue the flow of energy to said first mentioned motor.

6. A plural motor drive system for a processing line and the like comprising a principal driving motor of the alternating current type having a wound stator, an auxiliary driving motor coupled with the line through speed reduction gearing and an overrunning clutch whereby said principal motor may drive said line at high speed but upon said principal motor being deenergized to slow down said line to a predetermined fixed speed said auxiliary motor is operative to continue the driving of said line at reduced speed, means to deenergize said principal motor and to simultaneously apply direct current to said wound stator to dynamically brake said principal motor, and control means to deenergize said auxiliary motor.

7. Apparatus according to claim 6 further including time delay means to interrupt the direct current energization of said wound stator upon the expiration of a predetermined time interval following deenergization of said auxiliary motor.

8. Apparatus according to claim 6 further including a source of alternating current, a pair of inversely connected electronic discharge devices each having an ignition control element interconnecting said wound stator with said alternating current source, said means to deenergize said principal motor comprising means to interrupt conduction in one of said discharge devices, and said means to apply direct current to said wound stator comprising the other of said discharge devices.

9. Apparatus according to claim 8 further including an energizing circuit for the control element of the other of said discharge devices, said energizing circuit including means to apply an ignition current to said control element of said other discharge device at preselected times during alternate half cycles of the current of said source.

10. A drive system for a processing line and the like comprising a principal motor permanently coupled with the line, an auxiliary motor coupled with the line through reduction gearing and an overrunning clutch whereby upon deenergization of said principal motor said line may be continued to be driven but at reduced speed by said auxiliary motor, means to deenergize and dynamically brake said principal motor, and control means to deenergize said auxiliary motor.

11. Apparatus according to claim 10 further characterized by said means to dynamically brake said principal motor comprising a pair of inversely connected electronic discharge devices connecting said motor with a source of electrical energy.

12. A plural motor drive system for a processing line and the like comprising a principal motor coupled with the line, an auxiliary motor releasably coupled with said line whereby upon deenergization of said principal motor said line may be continued to be driven but at reduced speed by said auxiliary motor, means to deenergize and dynamically brake said principal motor, and control means to deenergize said auxiliary motor.

13. Apparatus according to claim 12 further including a source of alternating current, a pair of inversely connected electronic discharge devices interconnecting said motor and said alternating current source, said means to deenergize said principal motor comprising means to interrupt conduction in one of said discharge devices, and said means to dynamically brake comprising the other of said discharge devices.

14. Apparatus according to claim 13 further including an ignition control element for the other of said discharge devices, an energizing circuit for the control element of said other of said discharge devices, said energizing circuit including means to apply an ignition current to said control element of said other discharge device at preselected times during alternate half cycles of said source.

References Cited in the file of this patent

UNITED STATES PATENTS

| | | |
|---|---|---|
| 2,080,874 | Pecker | May 18, 1937 |
| 2,298,492 | Longfield | Oct. 13, 1942 |
| 2,393,010 | Arnold et al. | Jan. 15, 1946 |
| 2,735,055 | Thomas | Feb. 14, 1956 |
| 2,747,258 | Brandy | May 29, 1956 |